United States Patent
Michalski

[15] 3,639,260
[45] Feb. 1, 1972

[54] METHOD OF PREPARING ANTIFOAMING AGENT

[72] Inventor: Raymond J. Michalski, Riverdale, Ill.
[73] Assignee: Nalco Chemical Company, Chicago, Ill.
[22] Filed: Apr. 16, 1969
[21] Appl. No.: 816,796

[52] U.S. Cl. ............................252/358, 106/308 Q, 117/100 S, 117/123 C, 252/309, 252/321
[51] Int. Cl. ..................................B01d 19/04, B01j 13/00
[58] Field of Search......................252/321, 358, 309, 313 S; 117/100 S, 123; 106/308 Q

[56] References Cited

UNITED STATES PATENTS

| | | | |
|---|---|---|---|
| 2,802,850 | 8/1957 | Wetzel | 252/313 X |
| 2,891,875 | 6/1959 | Phreaner | 252/313 X |
| 3,076,768 | 2/1963 | Boylan | 252/358 |
| 3,267,042 | 8/1966 | Domba | 252/358 X |
| 3,359,294 | 12/1967 | Domba | 252/321 X |

*Primary Examiner*—Richard D. Lovering
*Attorney*—Kinzer, Dorn & Zickert, John G. Premo, Charles W. Connors and Morando Berrettini

[57] ABSTRACT

The activity of hydrophobic silica antifoamers in an oil dispersion is greatly enhanced by the presence of a polyfluorosilicate.

2 Claims, No Drawings

METHOD OF PREPARING ANTIFOAMING AGENT

This invention relates to an antifoaming agent in the form of hydrophobic silica to which a polyfluorosilicate is attached or combined therewith to enhance antifoam action.

Foaming of a liquid stock is often responsible for certain inefficiencies notably in the paper pulp industry, in the manufacture of latex paints, and in the recovery of unused monomers during production of synthetic rubber. It is known to reduce foaming in various liquid systems by treatment with hydrophobic silica. Hydrophobic silicas are known precisely by that designation in the art, but nonetheless hydrophobic silica is defined herein as finely divided silica (e.g. that precipitated from a silica hydrosol) treated with an oil or some other hydrophobic material such as a suitable silicone which renders the silica particles themselves hydrophobic. The agents for imparting hydrophobicity are many, as mentioned in U.S. Pat. No. 3,408,306; another mode of attaining hydrophobocity is disclosed herein in terms of an emulsion technique, constituting the subject matter of the copending application of Roger W. Youngs, Ser. No. 816,646, filed Apr. 16, 1969.

In accordance with the present invention, and as the primary object thereof, the ability of hydrophobic silicas to reduce foaming is greatly enhanced by combining it with a polytetrafluorosilicate and more specifically that which is the reaction product of polyethyl silicate and polytetrafluoroethylene. The silica may be of the ordinary precipitated form, rendered hydrophobic by a suitable agent, or it may be prepared in accordance with the Youngs disclosure.

The preferred method of producing the product of the present invention is to start with silica in an aqueous medium emulsified in a suitable oil as disclosed in the copending application of Roger W. Youngs. The source of silica may be a hydrosol, or sodium silicate dissolved in water, each of which is characteristic of a hydrophilic silica. The hydrophilic silica is rendered hydrophobic by attaching a hydrophobic surfactant to the silica—OH groups, and water is stripped from the system in accordance with the Youngs disclosure. The resultant product, hydrophobic silica of extremely small particle size dispersed in an oil, itself displays remarkable antifoaming propensity, and in accordance with the present invention this propensity may be increased by addition of a polytetrafluorosilicate. Example 1 to follow presents the preferred method of obtaining the present product.

EXAMPLE 1

| Material | Percent by Weight | Charge (lbs.) |
| --- | --- | --- |
| Paraffin oil (or mineral seal oil) | 75.6 | 900.8 |
| Silica hydrosol (15% SiO$_2$) | 18.9 | 225.2 |
| Silicone oil (dimethyl polysiloxane 50 cs.) | 0.95 | 11.3 |
| Glyceride (Atmul 84 grade) | 1.90 | 22.5 |
| Stearic acid (rubber grade) | 11.3 0.95 | |
| Fluoro-silicate polymer | 1.70 | 20.3 |

The fluoro-silicate polymer is preferably that of U.S. Pat. No. 3,359,294, being the reaction product of polytetrafluoroethylene and polyethyl silicate.

I. The reactor, topped by a condenser, is charged with paraffin oil (the dispersing medium), silicone oil, glyceride and stearic acid, with agitation. The free-board area within the reactor is then subjected to a vacuum of 100–150 mm. Hg., whereupon the reactor is charged with the silica sol while continuing to agitate the mixture. II. While maintaining the vacuum, and keeping the temperature within a 60°–65° C. range, water is slowly distilled from the emulsion, continuing agitation. The temperature will begin to rise when the water has been removed. Vacuum is maintained until a temperature of 160° C. is reached, whereupon the vacuum is broken by admission of nitrogen to the freeboard area. The temperature of the mixture is raised to 250° C., held for 4 hours to cause the silicone oil to attach to the silica particles, and then cooled to room temperature. The product thus obtained is useful as an antifoaming agent, but the activity thereof is greatly increased by stage III.

III. The product from stage II is cooled to about 40° C., whereafter the fluorosilicate polymer is added, resulting in an end product of enhanced antifoaming activity as hereinafter shown, but one which is preferably subjected to homogenization treatment. The yield is 965 to 980 pounds, depending upon the reactor efficiency.

While the silicone oil is preferably the one specified, any other silicone oil presenting alkyl or phenyl groups may be used.

Preferably, the hydrosol is of small particle size, five millimicrons or less particle (average) diameter, and hence a sodium silicate solution may also be used, provided it is acidified to a pH of about 3–10 in situ during emulsification. The concentration of silica in the aqueous medium, in any event, is one of choice, and one need only use enough oil (paraffin oil or mineral seal oil or both) and emulsifier to obtain micelle formation. Superior emulsification is obtained when using both the glyceride and stearic acid, but other emulsifying agents may be used, as disclosed in the Youngs application, incorporated herein by reference.

When water is stripped from the emulsion system, the silicone oil renders the silica completely hydrophobic, the silicone attaching itself to the colloidal silica particles as the mixture is heated. Homogenization is simply to assure that a highly dispersed state is indeed attained.

In any event, the end product at stage II may be classified as an emulsion-prepared hydrophobic silica-silicone oil complex (product II hereinafter) and the product of stage III may be classified as a hydrophobic silica-silicone oil-polyfluorosilicate complex (product III hereinafter) in which the antifoaming activity is enhanced by the fluorosilicate polymer as will be shown. Anitfoaming superiority of product II is shown in the Youngs application. Under the present invention, antifoaming capability of a hydrophobic silica is enlarged as will be now discussed in terms of a very severe foaming circumstance in the paper pulp industry.

Conditions for pulp manufacture not only vary from the standpoint of stages within the mill itself, but also any set of given processing conditions for paper manufacture can vary throughout a wide geographical area. The efficiency of an antifoaming agent of this invention was tested at a pulp processing mill in terms of its ability to render the pulp system more susceptible to effective washing treatment. Thus, as an economic measure, pulps are subjected to a washing action at an appropriate stage of processing in order to recover certain chemicals used for pulp treatment. However, foaming, characterizing the entrainment of air in the pulp slurry, decreases washing efficiency, and the prevalence of entrained air can be diminished by addition of an antifoaming agent.

It is customary to test washing efficiency by withdrawing a sample of the pulp and squeezing water therefrom. The amount of dissolved solids is measured by electrical conductivity. The less the amount of dissolved solids in the water squeezed from the pulp, the greater the washing efficiency. There are thus two factors susceptible of determination, the degree of foaming in the first instance and, separately, the measure of dissolved solids in the water squeezed from the pulp as a measure of antifoam activity.

Under this test, both product II and product III produced in accordance with example 1 were used as antifoaming agents, along with others, table 1, and while product II failed in spite of its exceptional performance independently in other foam environment, it must be understood that the foam circumstances of the test here reported in table I were severe:

TABLE 1

| Antifoam Agent | Dissolved Solids, p.p.m. |
| --- | --- |
| Product II | Excessive foaming—no measure of dissolved solids |
| ID-7-8 | practical |
| D-24 | ditto |
| Product III | ditto |
| Product III (check) | 385 |
| ID-7-8A | 350 |
| D-24A | 500 |
|  | 480 |

Agents ID-7-8 and D-24 in table 1 represent commercially available grades of hydrophobic silicas, themselves dispersed in an oil as a carrier; ID-7-8A and D-24A are the same silicas to which was added 2 percent by weight of the above identified tetrafluorosilicate polymer, the synergistic effect of which was confirmed by independent testing producing the results in table 2:

TABLE 2

| Agent | Amount to control foam (milliliters) |
| --- | --- |
| A | 135 |
| A+2%* | 90 |
| B | 126 |
| B+1%* | 75 |
| D | 105 |
| D+1%* | 70 |

*is % by weight of the copolymer of polyethyl silicate and polytetrafluoroethylene The agents A, B and D were samples of commercially available hydrophobic silica, dispersed in a paraffin oil. The amount to control the foam was that required to hold the foam to a standard volume, such that a decreasing amount signifies increasing activity of the foam control agent. In each instance the presence of the tetrafluorosilicate polymer was responsible for a marked increase in efficiency.

It will be seen from the foregoing that under the present invention the antifoam activity of hydrophobic silicas is increased remarkably by addition of a small amount of the copolymer of polytetrafluoroethylene and polyethyl silicate which need be no more than about 2 percent by weight of the silica. Preferably, the silica is an emulsion prepared silica, giving the highest activity under some circumstances, but the invention may also be applied to precipitated silicas.

What is claimed is:

1. A method of preparing an antifoaming agent in the form of a hydrophobic silica sol comprising, emulsifying in an oil-dispersing medium an aqueous system of hydrophilic silica in the presence of a surfactant capable of bonding to the —OH groups of the hydrophilic silica to render the latter hydrophobic, stripping water from the emulsified system resulting in an oil dispersion of the hydrophobic silica, and adding an effective amount of tetrafluorosilicate polymer sufficient to increase the antifoaming property of the resultant product, said polymer being the reaction product of a polytetrafluorethylene telomer having an average molecular weight of at least approximately 500 and a polyethyl silicate, reacted at a temperature of from 100°–300° C. for a period of from about 2 to 20 hours.

2. A method according to claim 1 in which the hydrophilic silica is a silica hydrosol of no greater than about 5 millimicrons particle size, in which the dispersing medium is selected from the group consisting of paraffin oil and mineral seal oil, and in which the surfactant is a silicone oil.

* * * * *

CERTIFICATE OF CORRECTION

Patent No. 3,639,260　　　　　　　　　　　　Dated February 1, 1972

Raymond J. Michalski

It is certified that errors appear in the above identified patent and that said Letters Patent are hereby corrected as shown below:

In the Specification:

Column 1, line 59, in Example 1, under "Percent by Weight" column should be --0.95-- and under "Charge (lbs.)" column should be --11.3--.

Signed and sealed this 25th day of July 1972.

(SEAL)
Attest:

EDWARD M. FLETCHER, JR.　　　　ROBERT GOTTSCHALK
Attesting Officer　　　　　　　　Commissioner of Patents